United States Patent [19]

Testi

[11] Patent Number: 4,609,973
[45] Date of Patent: Sep. 2, 1986

[54] METALLIZED PLASTIC FILM ELECTRIC CAPACITOR

[75] Inventor: Giancarlo Testi, Casalecchio di Reno, Italy

[73] Assignee: Italfarad S.p.A., Bologna, Italy

[21] Appl. No.: 678,140

[22] Filed: Dec. 4, 1984

[30] Foreign Application Priority Data

Dec. 23, 1983 [IT] Italy ................... 5140/83[U]

[51] Int. Cl.⁴ .............................................. H01G 9/06
[52] U.S. Cl. ................................................... 361/433
[58] Field of Search ........... 361/433 T, 433 H, 433 V, 361/433 W, 306, 307, 308

[56] References Cited

U.S. PATENT DOCUMENTS 3,986,083 10/1976 Carino ........................ 361/433 V
4,538,025 8/1985 Coe et al. .................. 361/433 H X

FOREIGN PATENT DOCUMENTS 1390720 4/1975 United Kingdom .......... 361/433 W

Primary Examiner—Donald A. Griffin
Attorney, Agent, or Firm—Guido Modiano; Albert Josif

[57] ABSTRACT

The capacitor comprises capacitor plates, housed in a cylindrical case. The cylindrical case defining an extension wherein a small plunger is sealingly guided. Leads electrically connect the plunger to the capacitor plates. In the event, that the internal pressure of the capacitor exceeds a preset level, the small plunger is adapted to move through an axial distance, effective to result in the leads being broken, thereby electrically disconnecting the capacitor.

2 Claims, 4 Drawing Figures

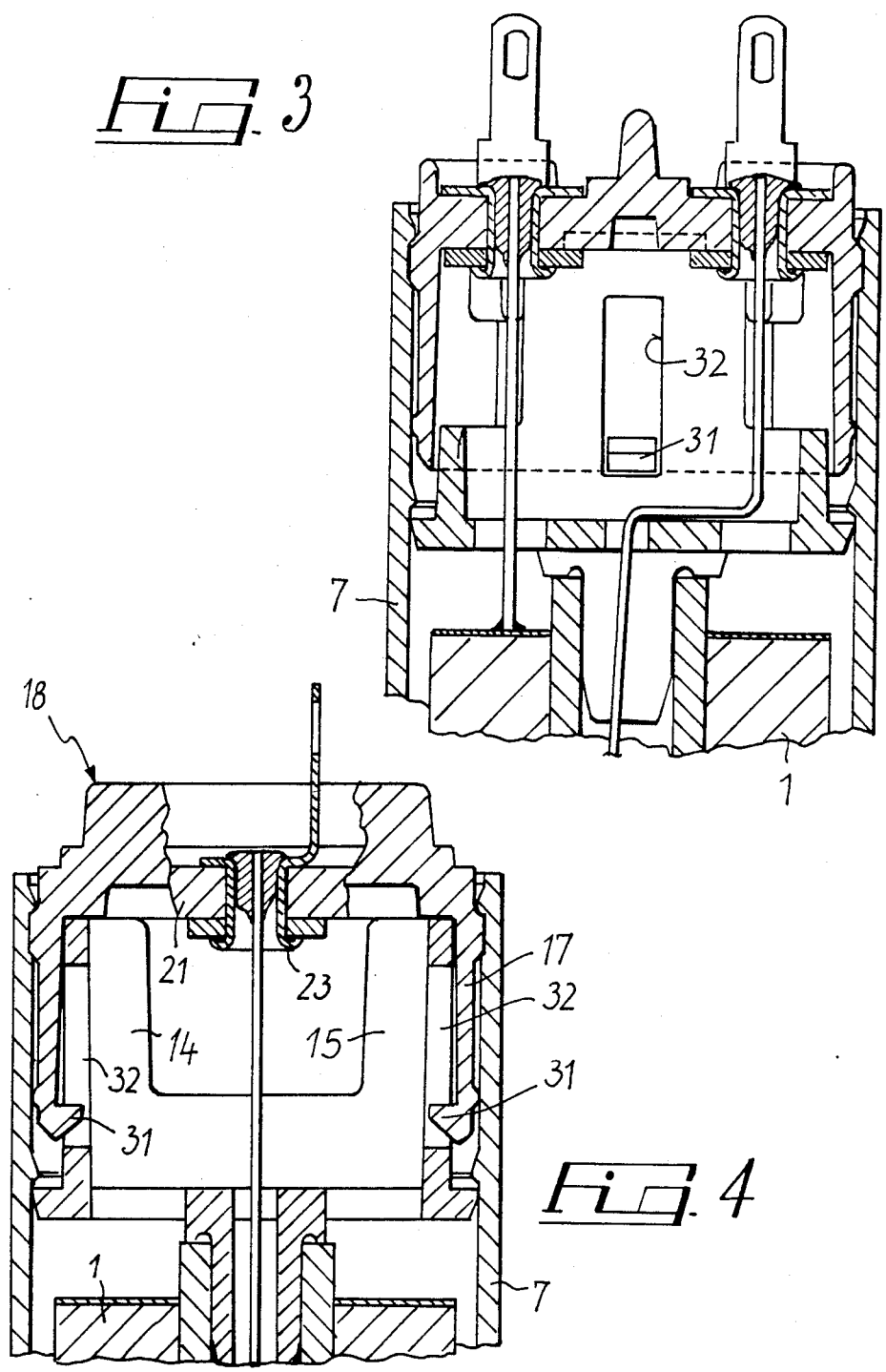

METALLIZED PLASTIC FILM ELECTRIC CAPACITOR

BACKGROUND OF THE INVENTION

This invention relates to a metallized plastic film electric capacitor incorporating a safeguarding device against explosion.

As is known, metallized plastic film capacitors, in time, undergo progressive deterioration of their electric characteristics due to instantaneous over-voltages causing perforation of the dielectric, or to ageing of the dielectric, or other causes. When such causes make the regenerative ability of the capacitor ineffective, an irreversible deterioration process begins, accompanied by the development of gas and a considerable increase in internal pressure, which may result in the capacitor exploding, with consequent serious damage for any surrounding equipment and danger for any persons in the proximate vicinity.

Furthermore, it may happen that rupture of the capacitor, by admitting air oxygen thereinto, triggers a combustion process leading to obviously serious situations.

In an attempt to obviate such drawbacks, capacitor designs have already been proposed, wherein the outer case is formed as a metal shell pleated with annular corrugations to thereby allow the shell to expand axially in the event of an excessive increase of the capacitor internal pressure.

That expansion is utilized to place under tension, and accordingly break, at least one of the two leads connected to the capacitor plates, thus cutting off the current supply and stopping the development of gas.

However, conventional capacitors have not negligible disadvantages which mainly originate from the complexity of the shell construction and effectuation of the connections.

SUMMARY OF THE INVENTION

It is the technical aim of this inveniton, therefore, to provide an electric capacitor incorporating a safeguard device which, when compared to conventional ones, is easily manufactured at an economical cost, while being highly reliable in operation.

This aim is achieved by an electric capacitor, which is characterized in that it comprises a case having an extension wherein a small plunger is guided slidably in sealed relationship with the case inside surface, and whereto the ends of the leads connected to the capacitor plates are connected, said small plunger, on the capacitor internal pressure exceeding a preset level, being adapted to move through an axial distance to break or electrically disconnect said leads.

BRIEF DESCRIPTION OF THE DRAWINGS

Further features will be more readily understood from the following description with reference to the accompanying drawing, where:

FIG. 3 is a sectional view of the upper portion of a modified embodiment of this capacitor; and FIG. 4 is a sectional view of the capacitor of FIG. 3, taken on a plane rotated through 90°.

DESCRIPTION OF THE PREFERRED EMBODIMENTS

Figure 1:
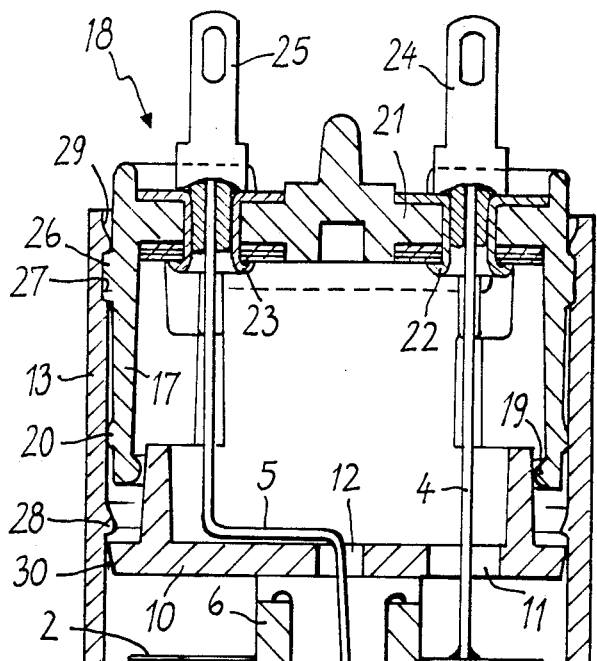
FIG. 1 shows a longitudinal section view of a capacitor according to the invention.
Figure 2:
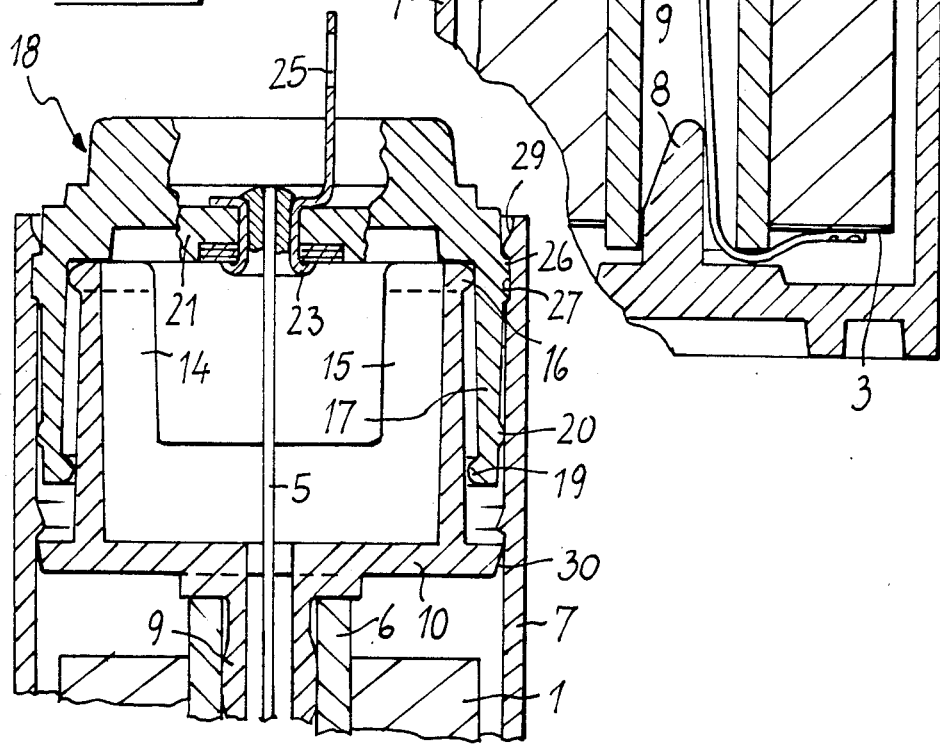
FIG. 2 shows a sectional view taken through the upper portion of this capacitor on a plane rotated through 90° from that of FIG. 1.

This capacitor comprises a cylindrical winding 1, for example, formed with metallized plastic films so arranged as to leave the metallized sides (plates) accessible from the opposed ends of the winding. In fact, it is contemplated that a conductive layer connecting the turns of each film be applied at such ends.

The upper metallized layer is indicated at 2 and the lower one at 3. Soldered to such layers are the respective ends of leads 4 and 5 for electrically connecting the capacitor. In particular, for connection to the lower layer 3, the lead 5 is routed through a small tube 6 which is passed axially through the winding 1 and on which the latter is wound. The winding 1 is housed in a cylindrical case 7 and centered inside it by means of a pair of pins 8 and 9 which are inserted through the opposed ends of the small tube 6.

The pin 8 extends upwards from the bottom 9 of the case 7, and has a cutout therein to allow the lead 5 to be passed. The pin 9 extends downwards from a disk 10 centered in the case 7 and which is formed with two apertures 11 and 12 for passage of the leads 4 and 5. The case 7 is molded from a suitable plastic material and comprises a portion 13 which extends beyond the disk 10.

From the disk 10, there project axially into the portion 13 two cylindrical segments 14,15 which have outer teeth 16 at the top. Defined between the tubular segments 14,15 and portion 13 is a space which is engaged by a bushing 17 being an integral part of a small inverted cup-like plunger 18 arranged to close the top of the case 7. The bushing 17 is provided, at its bottom end, with an inner annular ridge 19 and an outer collar 20 in sealed contact relationship with the bushing inside surface. The cup-like plunger 18 includes a cover 21 whereto rivets 22,23 are attached for two rheophores 24,25 having connected to them, as by soldering, the two leads 4,5. The small plunger 18 is secured within the tubular portion 13 by means of a peripheral rib 26 on the bushing 17 engaging in a mating groove 27 in the portion 13.

Likewise, for axially retaining the disk 10, an inside shoulder 28 is provided in the case 7 which prevents the disk from coming out once it has been force fitted into the case 7 beyond the shoulder.

Advantageously, to facilitate insertion of the small cup-like plunger 18 and disk 10, lead-in bevels 29 and 30 are formed at the inside rims of the case and disk 10.

Now, when in a capacitor as described above gas is developed on acount of a short circuit, the internal pressure will increase progressively and act on the plunger 18.

The plunger 18 remains stationary until, on exceeding a critical level determined by the rib 26 abutting against the groove 27 and by the strength of the lead 4, the small plunger 18 is pushed out of the case, causing separation of the leads and the current supply to the capacitor to be cut off. Thus, any short circuit is interrupted together with the development of gas, preventing explosion of the capacitor.

It should be noted that the ejection of the plunger 18 from the case is stopped upon the annular ridge 19 contacting the teeth 16 on the cylindrical segments 14,15.

A peculiar aspect of this invention is that, as the internal pressure rises, the collar 20 is urged against the inside surface of the portion 13, thus preventing gas leakages which might jeopardize the effectiveness of the required tensile force to cause separation of the leads.

In the example shown, it is contemplated that the ejection of the small plunger causes the lead 4 to be disconnected from the plate 2. However, within the same innovative concept, separation of both leads, 4 and 5, or breakage of the same could also be provided. To facilitate breakage of the leads, the latter may be formed with weakening notches, or alternatively, be arranged to contact sharp edges capable of indenting them, during the tension stage. To stop the plunger 18, instead of the annular ridge 19 and teeth 16, hooks 31 may be provided which would engage in slots 32 in the segments 14,15.

I claim:

1. A metallized plastic film electric capacitor, including capacitor plates whereto ends of leads are attached, said metallized plastic film electric capacitor comprising a cylindrical case and a small plunger, said cylindrical case having an extension, said small plunger being guided sealingly within said extension of said cylindrical case, said ends of said leads being connected to said capacitor plates, said capacitor plates being connected to said extension of said cylindrical case, said small plunger being adapted to move through an axial distance effective to result in said leads being broken or electrically disconnected, upon the internal pressure of said metallized plastic film electric capacitor exceeding a preset level, said small plunger being of cup-like configuration and comprising a bushing portion, said bushing portion having an outer collar, said bushing portion being further formed with an inner annular ridge, said outer collar being adapted to seal against the inside surface of said extension of said cylindrical body, said small plunger further comprising a cover, said metallized plastic film capacitor further comprising capacitor rheophores, said capacitor rheophores being attached to said cover.

2. A metallized plastic film electric capacitor according to claim 1, further comprising a winding and a disk, said disk having a first face and a second face, said disk being adapted for securing said winding to the inside of said cylindrical case of said metallized plastic film electric capacitor, said disk being inserted into said cylindrical case and having, at said first face thereof, a centering pin, said centering pin engaging axially with said winding, said disk defining, at said second face thereof, two cylindrical segments, said two cylindrical segments having teeth, said teeth being formed on the outside of said two cylindrical segments and being adapted to abut against said annular ridge inside said bushing portion of said small plunger upon the latter being pushed out of said cylindrical case, said bushing portion of said small plunger being formed with teeth, and said two cylindrical segments having axially extending slots formed therein, said axially extending slots being adapted for engagement by said teeth formed on said bushing portion of said small plunger.

* * * * *